(12) United States Patent
Roberts-Thomson et al.

(10) Patent No.: US 10,451,438 B2
(45) Date of Patent: Oct. 22, 2019

(54) SYSTEMS AND METHODS FOR IN-MOTION GYROSCOPE CALIBRATION

(71) Applicant: AlpineReplay, Inc., Huntington Beach, CA (US)

(72) Inventors: Claire Louise Roberts-Thomson, Ann Arbor, MI (US); Anatole M. Lokshin, Huntington Beach, CA (US); Vitaly A. Kuzkin, Saint Petersburg (RU)

(73) Assignee: ALPINEREPLAY, INC., Huntington Beach, CA (US)

( * ) Notice: Subject to any disclaimer, the term of this patent is extended or adjusted under 35 U.S.C. 154(b) by 86 days.

(21) Appl. No.: 15/017,375

(22) Filed: Feb. 5, 2016

(65) Prior Publication Data

US 2016/0231138 A1    Aug. 11, 2016

Related U.S. Application Data

(60) Provisional application No. 62/112,588, filed on Feb. 5, 2015.

(51) Int. Cl.
*G01C 25/00* (2006.01)
*G01C 19/00* (2013.01)

(52) U.S. Cl.
CPC .......... *G01C 25/005* (2013.01); *G01C 19/00* (2013.01)

(58) Field of Classification Search
CPC .............................. G01C 25/005; G01C 19/00
(Continued)

(56) References Cited

U.S. PATENT DOCUMENTS

| | | |
|---|---|---|
| 5,297,050 A | 3/1994 | Ichimura et al. |
| 5,345,382 A | 9/1994 | Kao |

(Continued)

FOREIGN PATENT DOCUMENTS

| | | |
|---|---|---|
| EP | 1310770 | 5/2003 |
| EP | 2306149 | 4/2011 |

(Continued)

OTHER PUBLICATIONS

International Patent Application PCT/US2011/059825, International Search Report and Written Opinion, dated Jun. 1, 2012.

(Continued)

*Primary Examiner* — Dzung Tran
(74) *Attorney, Agent, or Firm* — Greenberg Traurig, LLP

(57) ABSTRACT

Systems and methods to calibrate a gyroscope based on a motion of a predetermined characteristic. Data representing gyro sensor signals during a period of time is stored. A portion of the time period is identified, during which portion the gyroscope is subjected to a motion of the predetermined characteristic. Using the stored data the gyro signals are integrated with respect to time to calculate orientation of the gyroscope as a function of time. Deviation of a characteristic of the orientation of the gyroscope as the function of time during the portion of time period for the motion of the predetermined characteristic is determined to identify a component of bias in the gyro signals. The bias component is removed from the data to re-calculate the gyroscope orientation, and possible to further calculate the deviation in the re-calculated orientation and to identify a further bias component in the gyro signals.

15 Claims, 9 Drawing Sheets

(58) Field of Classification Search
USPC .......................................................... 702/94
See application file for complete search history.

(56) References Cited

U.S. PATENT DOCUMENTS

| | | | |
|---|---|---|---|
| 8,351,773 B2 | 1/2013 | Nasiri et al. | |
| 9,146,134 B2 | 9/2015 | Lokshin et al. | |
| 2003/0018430 A1* | 1/2003 | Ladetto | G01C 21/16 701/472 |
| 2003/0137433 A1 | 7/2003 | Schiller et al. | |
| 2004/0020064 A1 | 2/2004 | Levi et al. | |
| 2004/0064252 A1 | 4/2004 | Kirkland et al. | |
| 2005/0242947 A1 | 11/2005 | Burneske et al. | |
| 2007/0032951 A1* | 2/2007 | Tanenhaus | G01C 21/16 702/151 |
| 2007/0055468 A1 | 3/2007 | Pylvanainen | |
| 2009/0119016 A1 | 5/2009 | Tanino et al. | |
| 2009/0254294 A1* | 10/2009 | Dutta | G01C 17/28 702/92 |
| 2011/0066392 A1* | 3/2011 | Judd | G01C 17/38 702/93 |
| 2011/0178707 A1 | 7/2011 | Sachs et al. | |
| 2012/0092676 A1* | 4/2012 | Wang | G01C 19/72 356/461 |
| 2012/0116716 A1 | 5/2012 | Lokshin et al. | |
| 2012/0200500 A1* | 8/2012 | Ohta | A63F 13/00 345/158 |
| 2016/0113550 A1* | 4/2016 | Martin | A61B 5/6898 600/595 |
| 2016/0166180 A1* | 6/2016 | Martin | A61B 5/112 702/141 |

FOREIGN PATENT DOCUMENTS

| | | |
|---|---|---|
| JP | 2243917 | 9/1990 |
| JP | 5187880 | 7/1993 |
| JP | 2006038650 | 2/2006 |
| WO | 2002037827 | 5/2002 |

OTHER PUBLICATIONS

The Extended European Search Report 11840257.7, dated Feb. 20, 2014.

* cited by examiner

SYSTEMS AND METHODS FOR IN-MOTION GYROSCOPE CALIBRATION

RELATED APPLICATIONS

The present application claims the benefit of the filing date of Prov. Pat. App. Ser. No. 62/112,588, filed Feb. 5, 2015 and entitled "Systems and Methods for In-motion Gyroscope Calibration", the entire disclosure of which application is hereby incorporated herein by reference.

The present application relates to U.S. patent application Ser. No. 13/291,844, filed Nov. 8, 2011, entitled "Device and Method of Gyro Sensor Calibration", now U.S. Pat. No. 9,146,134, the entire disclosure of which application is hereby incorporated herein by reference.

FIELD OF THE TECHNOLOGY

At least some embodiments disclosed herein relate generally to gyroscope and more specifically, but not limited to, calibration of gyroscope sensors.

BACKGROUND

Gyroscope calibration is important to obtain accurate measurements of the orientation of a gyroscope as a function of time. The sensors of a gyroscope measure the angular velocity of a gyro to generate gyroscope signal as a function of time. The orientation of the gyroscope can be obtained by integrating the gyroscope signal throughout time, starting from a time instant when the orientation of the gyroscope is known. If the gyroscope signal, or gyro signal, contains a bias, the error in the computed orientation of the gyroscope caused by the bias accumulates over time through the integration of the gyro signal with respect to time. Thus, calibrating the gyroscope signal from the gyroscope is important for accurate determination of the orientation of the gyroscope.

During a time period in which the gyroscope is stationary and non-rotating, gyroscope bias can be estimated using simple methods such as averaging the gyroscope signal. When the gyroscope is stationary and not rotating, an average of the gyroscope signal over a period of time is expected to be zero. Thus, when the average of the gyroscope signal is not zero, the average is the bias that can be subtracted from the gyroscope signal to generate the calibrated gyroscope signal, such that the average of the calibrated gyroscope signal is zero.

A bias, even once determined, can change in time due to the changes in temperature or other environmental parameters. Thus, it is preferred to perform calibration periodically to remove bias from the gyroscope signal for accurate determination of gyroscope orientation.

In many practical situations, however, such simple methods for estimating gyroscope bias are not appropriate, since stationary data is often not available (e.g. when the gyro is constantly in motion). Additionally, there could be time constraints on estimating (or updating an estimate of) bias that do not allow the use of stationary data. In such situations, a more sophisticated method for estimating gyroscope bias that can be used while device is in motion is needed.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

At least one embodiment disclosed herein overcomes the limitations of conventional, simple methods of bias calibration for gyroscope and allows gyroscope bias calibration during device motion.

Figure 1:
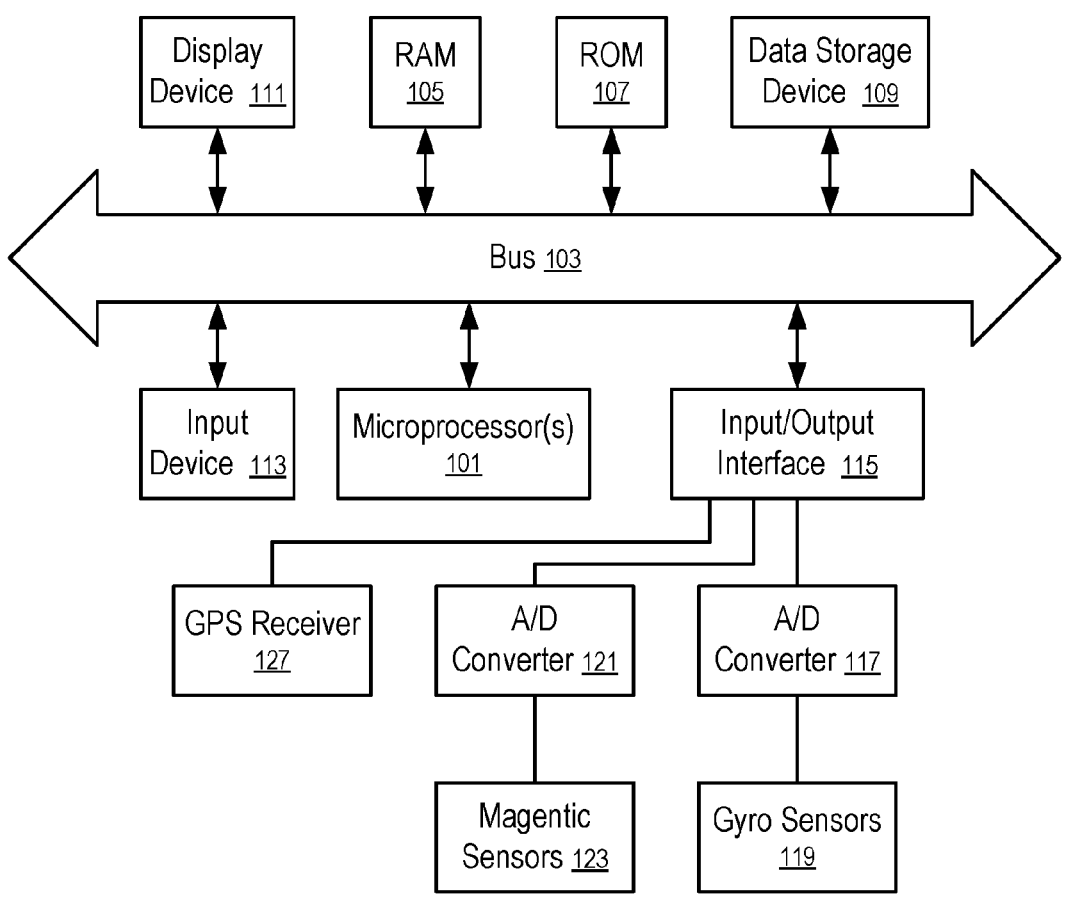
FIG. 1 shows a system to calibrate gyroscope sensors according to one embodiment.

FIG. 1 shows a system to calibrate gyroscope sensors according to one embodiment.

In the system of FIG. 1, a set of gyro sensors (119) are configured to measure the angular velocities of a gyro along a plurality of axes. An analog to digital (A/D) converter (117) converts the analog signals from the gyro sensors (119) into digital signals for the input/output interface (115) of a computing device that performs the bias calibration. Optionally, the system further includes a global positioning system (GPS) receiver (127), a magnetometer having magnetic sensors (123) with a corresponding A/D converter (121), and/or an accelerometer (not shown in FIG. 1).

In FIG. 1, the computing device is configured with an input/output interface (115) to receive the digital signals that are converted by the converter (117) from the analog signals generated by the gyro sensors (119).

The computing device further includes a bus (103) that connects the input/output interface (115), at least one microprocessor (101), random access memory (105), read only memory (ROM) (107), a data storage device (109), a display device (111), and an input device (113).

The memory devices (e.g., 105, 107, and 109) store instructions configured to perform various operations disclosed herein to determine the bias in gyro sensors (119) and calibrate the signals of the gyro sensors (119). In one embodiment, after the bias is determined, the A/D converter (117) is instructed to remove the bias from the signals generated by the gyro sensors (119). Alternatively, the bias data is stored in one or more of the memory devices (e.g., 105 or 109); and the microprocessor(s) (101) is configured with the instructions to calibrate the gyro sensors by subtracting the bias from the digital signals received from the A/D converter (117) and/or incorporate the bias in computing the orientation of the gyroscope using the digital signals from the A/D converter (117).

The computing device of one embodiment is configured to store at least a portion of the digital data received from the A/D converter (117), and use the stored portion of the digital data to compute the bias, and apply the bias to the stored digital data to generate orientation data of the gyroscope.

In FIG. 1, the display device (111) and the input device (113) are configured via the instructions to provide a user interface that allows the user to view the digital signals from the A/D converter (117), the bias, the corrected/calibrated gyroscope signals, and gyroscope orientation computed from the gyroscope signals, etc. In some embodiments, the user interface is further configured to allow the user to provide indications for the selection of a period of time and cause the computing device to use the gyroscope signals generated in the user identified period of time to perform bias identification and gyroscope calibration.

Figure 2:
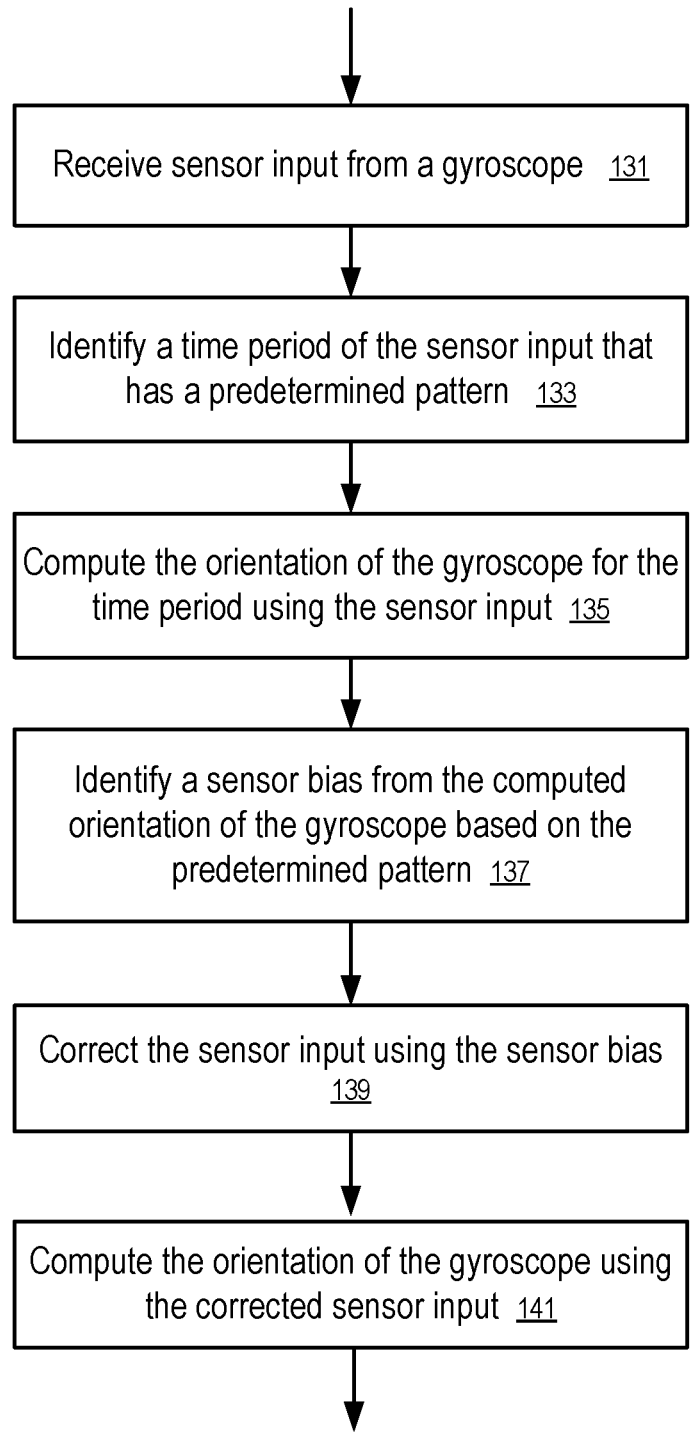
FIG. 2 shows a method to calibrate gyroscope sensors according to one embodiment.

FIG. 2 shows a method to calibrate gyroscope sensors according to one embodiment. For example, the method of FIG. 2 can be implemented in the system of FIG. 1.

In FIG. 2, a computing device (e.g., as illustrated in FIG. 1) is configured to: receive (131) sensor input from a gyroscope; identify (133) a time period of the sensor input that has a predetermined pattern; compute (135) the orientation of the gyroscope for the time period using the sensor input; identify (137) a sensor bias from the computed orientation of the gyroscope based on the predetermined pattern; correct (139) the sensor input using the sensor bias; and compute (141) the orientation of the gyroscope using the corrected sensor input.

For example, when the gyroscope having the gyro sensors (119) is in a time period of motion with slow changing trajectory without large rotations and with possible small oscillations, the average of the computed orientation is expected to remain constant. Deviation of such a characteristic of the orientation of the gyroscope from an ideal target of remaining constant during the time period is a result of the bias. The deviation is detected and used to quantify the bias and calibrate the gyro sensors (119). For example, the linear fitted slope of the computed orientation can be identified as the result of a bias in the gyro signal and used for calibration.

For example, in a short period of time (e.g., 1 second), the gyroscope is stationary and/or its orientation is known (e.g., aligned with a known track, a starting position). The time window may be too short to estimate the gyroscope bias directly using a simple average of the gyroscope signal. During the short period of time, an initial orientation of the gyroscope is determined. After the short period of time, the gyroscope may be subjected to a motion having a predetermined pattern that has a relatively slow changing trajectory with small oscillations but no large rotations. Examples of such motions include the motion of the board of a surfer while the surfer is paddling, and the motion of the ski of a skier while the skier is zigzagging and descending a slope. While the gyroscope is experiencing such a motion, the gyro data can be processed to identify the bias in the output of the gyro sensors (119). Through integration of the gyro sensor signals over time from the initial orientation of the gyroscope, the orientation of the gyroscope during the time period of the motion having such a pattern is computed. Each of the orientation angles of the gyroscope can be fitted to a line with respect to time. The slope of the line represents the estimated bias in the output of the gyro sensors (119).

For example, the calibration method can be used to estimate and remove bias in sensor signals from a gyroscope attached to a piece of sports equipment, such as a snowboard or surfboard, as well as to other systems, devices, or objects. To perform the calibration, two time periods are identified. In the first time period, the orientation of the gyroscope is known; and in the second time period, the gyroscope is subjected to a motion having the characteristics of following a slow changing trajectory without large rotations (but may have small oscillations). After the initial orientation of the gyroscope is estimated, the gyroscope signals are integrated from the time of the initial orientation of the gyroscope through the second time period to obtain the orientation of the gyroscope as a function of time in the second time period.

To identify a component of gyroscope bias, the method of one embodiment removes the components of the bias that have been identified thus far from the gyroscope signals in the integration time period starting from the time of the initial orientation through the second time period to obtain a version of the calibrated gyroscope signals. Integration of the calibrated gyroscope signals through the integration time period provides the orientation as a function of time during the second time period, which is typically the ending portion of the integration time period for bias detection. The computed orientation can be expressed in a roll-pitch-yaw angular representation. Optionally, the magnetic angle representing current magnetic declination is computed in a suitable domain (e.g., without wrapping at ±180 degrees, etc.) to replace the yaw data. A linear fit is performed for each of the roll-pitch-yaw angles as a function of time in the second time period. The slopes of the linear fit of roll-pitch-yaw correspond to the component of gyroscope bias. The component of bias is selected to retain, using a fixed ordering, or by choosing the component with smallest least-squared error of linear fit that has not yet been calibrated. The gyroscope signals are further calibrated by removing the newly identified component of bias. The newly identified component of bias is combined with the previously identified component of bias to determine the total bias found. The process of identifying a new component of bias can be repeated for the same integration time period to improve the accuracy of the bias found.

More specifically, orientation can be represented using quaternions L. Each quaternion can be associated with an angle $\alpha$ and unit axis $\hat{u}$ (rotation by angle $\alpha$ about axis $\hat{u}$), where $$L(\alpha,\hat{u})=\cos(\tfrac{1}{2}\alpha)+\sin(\tfrac{1}{2}\alpha)(\hat{u}_1 i+\hat{u}_2 j+\hat{u}_2 k).$$

Figure 19:
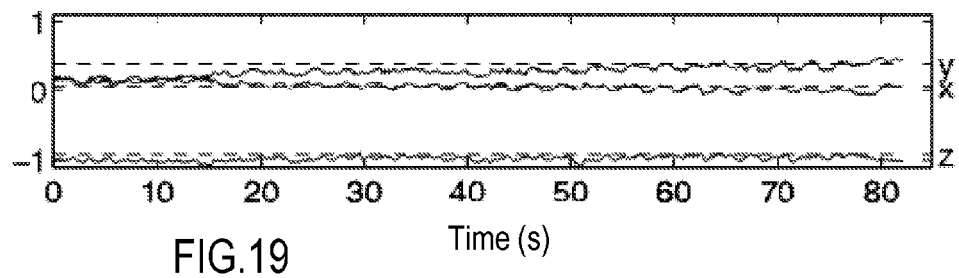
Figure 20:
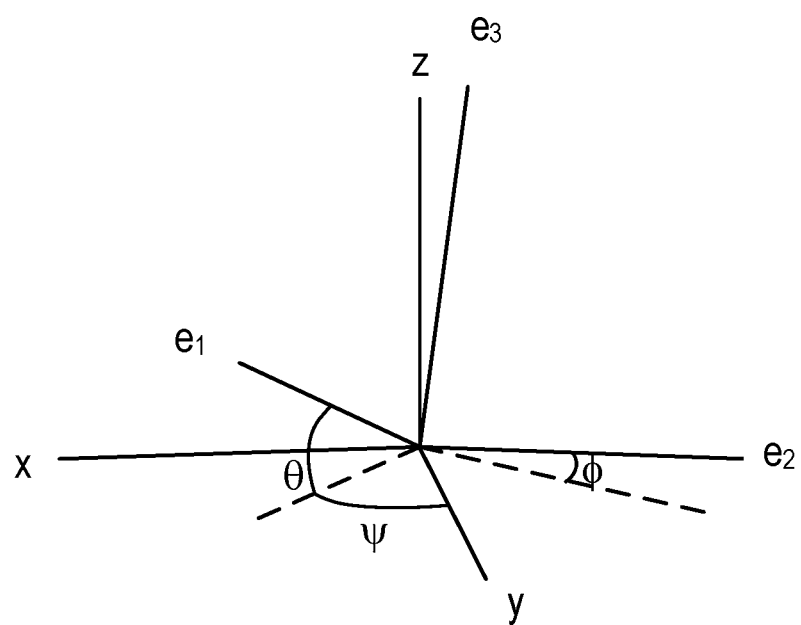
FIG. 20 illustrates the relations among the gyro axes, the global reference axes, and the orientation angles.

The orientation quaternion convention used is such that $$e_1(t) = L(t) * \hat{x} * L(t)^{-1}$$

$$e_2(t) = L(t) * \hat{y} * L(t)^{-1}$$

$$e_3(t) = L(t) * \hat{z} * L(t)^{-1}$$

where $e_i$ are the gyroscope axes, and $\hat{x}$, $\hat{y}$, $\hat{z}$ are the global (real-world) coordinate axes East, North, and Up, and * denotes quaternion multiplication. FIG. 20 illustrates the relations among the axes and the orientation angles, where the orientation is represented by quaternion L with Tait-Bryan roll-pitch-yaw angles $\phi$, $\theta$, and $\psi$. In FIG. 19, axes x, y, z correspond to the global (real-world) coordinate axes East, North, and Up, and axes $e_1$, $e_2$, $e_3$ are the gyroscope axes.

In practice, candidates of suitable time periods over which to estimate bias can be identified using a variety of methods, e.g., by identifying where a surfer is paddling, or a skier is descending a hill, and then applying additional criteria to find a period of time where motion meets a predetermine characteristic (e.g., being along a relatively slow changing trajectory without large rotations, having an initial orientation that can be determined from a known orientation). The additional criteria for find the period of time can also include linear fitting, examination of magnetic data, and/or thresholds for lack of motion for finding the initial condition.

The initial orientation of the device $L_0$ can be known (e.g., based on the position of the equipment to which the gyroscope is attached), or be estimated in any number of ways. If accelerometer and magnetometer data are available, for example, a tilt-compensated compass method could be used. The results of a tilt-compensated compass can be enhanced using linear acceleration from GPS data, if available.

3-axis gyroscope data $\omega(t)$ can be integrated to give quaternions L(t) that represent the device's orientation by solving the differential equation $$\frac{dL}{dt} = \frac{1}{2} * L * \omega$$

where * denotes quaternion multiplication, subject to the initial condition $L(t=0)=L_0$. It is also possible to solve the following differential equation "backwards in time":

$$\frac{dL(\tau)}{d\tau} = -\frac{1}{2} * L(\tau) * \omega(\tau)$$

where $\tau = t_f - t$ is a time-like variable, if the initial condition $L(t=t_f)=L_f$ can be better estimated at the end of the time period.

Once the orientation quaternions L have been found, the orientation is expressed in a Tait-Bryan angular representation of the device's orientation. The representation chosen can be in the form of roll $\phi$, pitch $\theta$, yaw $\psi$, where $$L(t) = L_\phi(t) * L_\theta(t) * L_\psi(t)$$

and $$L_\psi = L(90-\psi, \hat{z})$$

$$L_\theta = L(-\theta, L_\psi * \hat{y} * L_\psi^{-1})$$

$$L_\phi = L(\phi, L_\theta * L_\psi * \hat{x} * L_\psi^{-1} * L_\theta^{-1}))$$

using the angle and axis to represent each quaternions. In such a representation, yaw $\psi$ is the device's heading (direction of $\hat{e}_1$), pitch $\theta$ is its angle above horizontal (angle of $\hat{e}_1$ above horizontal), and roll $\phi$ is its rotation about the direction with the correct heading and angle above horizontal ($\hat{e}_1$) where positive is denoted by the right hand ("RH") rule (with the right hand in a "thumbs up" gesture with the thumb pointing in the direction of the heading at the angle above horizontal, the fingers indicate the positive direction).

For the kind of motion satisfying condition of being along a relatively slow changing trajectory without large rotations and having small oscillations around a common direction, bias is estimated by finding a linear fit to the orientation angles $\phi$, $\theta$, and $\psi$. This linear fit might only be for some time within the period of integration, e.g. it might start 5 seconds after integration begins to allow for larger motion of the device as it starts moving.

Figure 3:
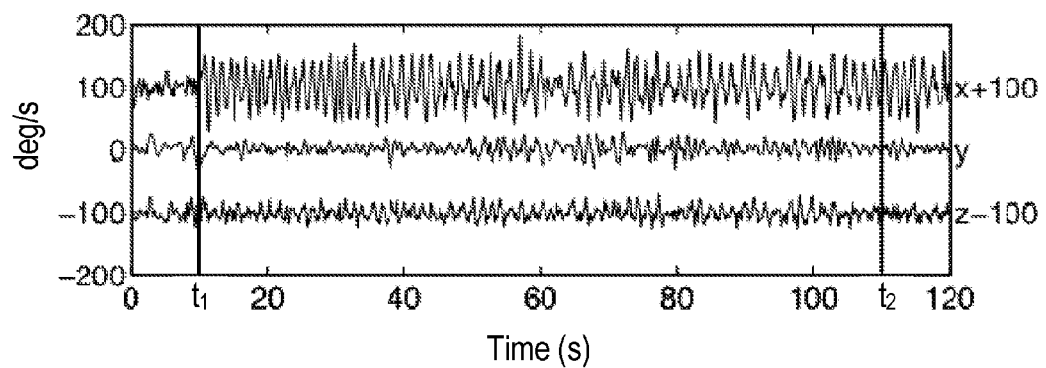
FIG. 3 shows an example set of gyro sensor data collected from a gyroscope attached to a board of a surfer while the surfer is paddling.
Figure 11:
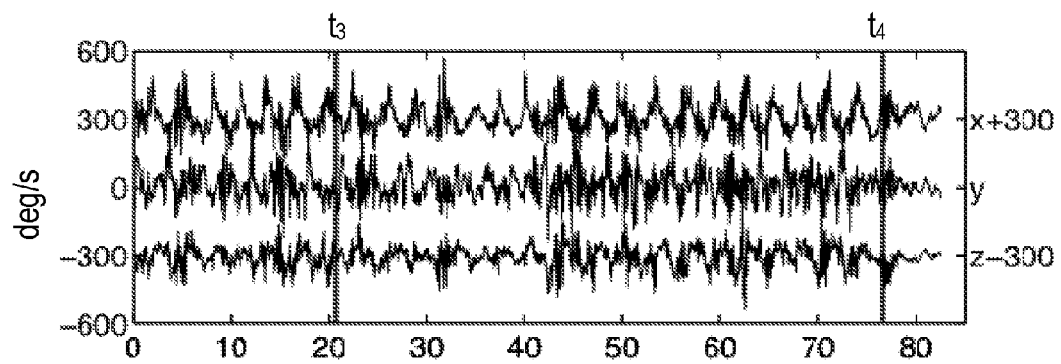
FIG. 11 shows an example set of gyro sensor data collected from a gyroscope attached to a ski of a skier while the skier descends a slope.

For example, FIG. 3 shows a set of gyro sensor data (x+100, y, and z−100) collected from a gyroscope attached to a board of a surfer while the surfer is paddling during the time period from $t_1$ to $t_2$. FIG. 11 shows a set of gyro sensor data (x+300, y, z−300) collected from a gyroscope attached to a ski of a skier while the skier descends a slope during the time period from $t_3$ to $t_4$.

Figure 5:
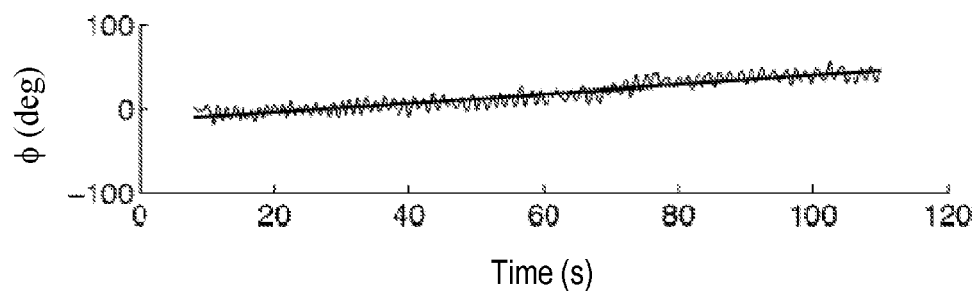
FIGS. 5-7 illustrate linear fitting of angular representation of the orientation of the gyroscope attached to the board of the surfer while the surfer is paddling.
Figure 6:
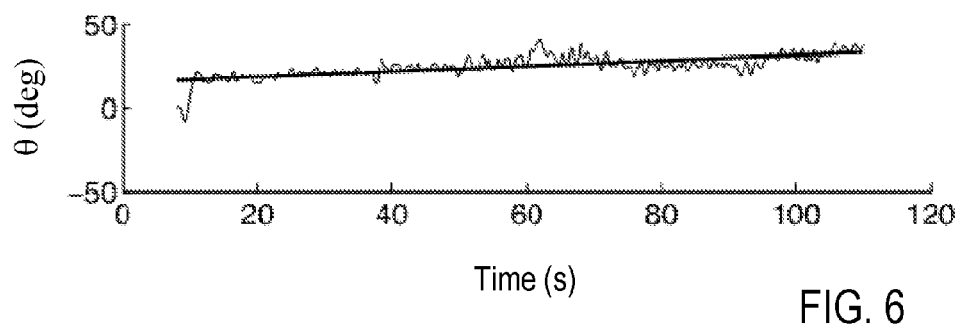

FIGS. 5 and 6 show the orientation angles $\phi$ and $\theta$ computed from the sensor data illustrated in FIG. 3. The straight lines in FIGS. 5 and 6 represent the linear fit of the orientation angles $\phi$ and $\theta$ during the time period from $t_1$ to $t_2$.

Figure 14:
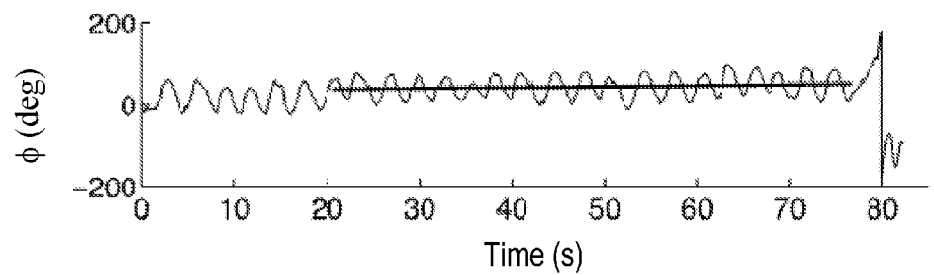
FIGS. 14-16 illustrate linear fitting of angular representation of the orientation of the gyroscope attached to the ski of the skier while the skier descends the slope.
Figure 15:
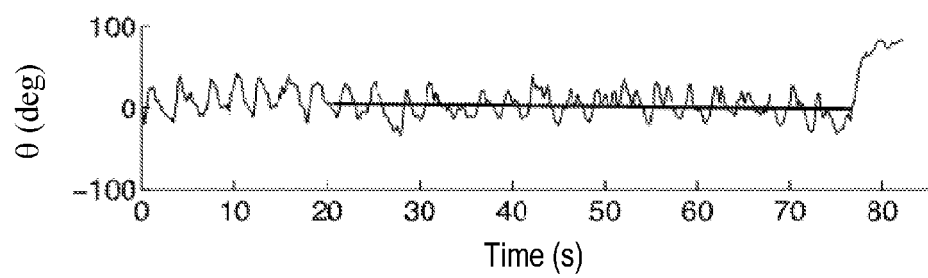

FIGS. 14 and 15 show the orientation angles $\phi$ and $\theta$ computed from the sensor data illustrated in FIG. 11. The straight lines in FIGS. 14 and 15 represent the linear fit of the orientation angles $\phi$ and $\theta$ during the time period from $t_3$ to $t_4$.

A linear fit to the orientation angle $\psi$ computed from the sensor data can be performed in a similar way as illustrated in FIGS. 5, 6, 14 and 15 for the orientation angles $\phi$ and $\theta$. Then the estimated gyroscope bias is $$b = [a_\phi, a_\theta, a_\psi]$$

where $a_\phi$, $a_\theta$, and $a_\psi$ are the slopes from the linear fit to the angles $\phi$, $\theta$, and $\psi$ respectively.

In some embodiments, the bias may be computed one component at a time; after one component of bias is computed, it is subtracted from the gyroscope data and the quaternions and angles are recomputed. The order of estimating bias components can be fixed, or it could be determined by some other method, such as by choosing a component not yet calibrated with best linear fit as determined by least-squared error.

If 3-axis magnetometer data is available, the result can generally be improved by leveraging the magnetic data. In such cases, we may switch $\theta_m$ for $\psi$, where $$\theta_m = \tan^{-1}\left(\frac{\hat{m} \cdot \hat{x}}{\hat{m} \cdot \hat{y}}\right)$$

and $\hat{m}$ is the unit magnetic vector obtained from magnetometer data written in global coordinates.

Figures 12, 13:
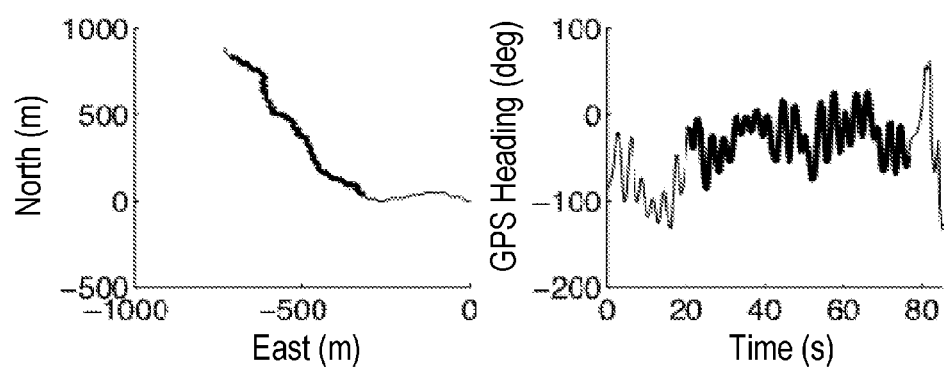
FIG. 12 shows an example set of GPS position data collected from a GPS receiver attached to the ski of the skier while the skier descends the slope.
FIG. 13 shows an example set of GPS heading data of the GPS receiver attached to the ski of the skier while the skier descends the slope.

The angle $\theta_m$ may loosely be described as the current magnetic declination. In general, $\theta_m$ gives a better result, as in the absence of large changes in the ambient magnetic field the magnetic declination should be constant, whereas the device heading may not be constant during the period of time chosen, as illustrated in FIGS. 12 and 13.

Figure 4:
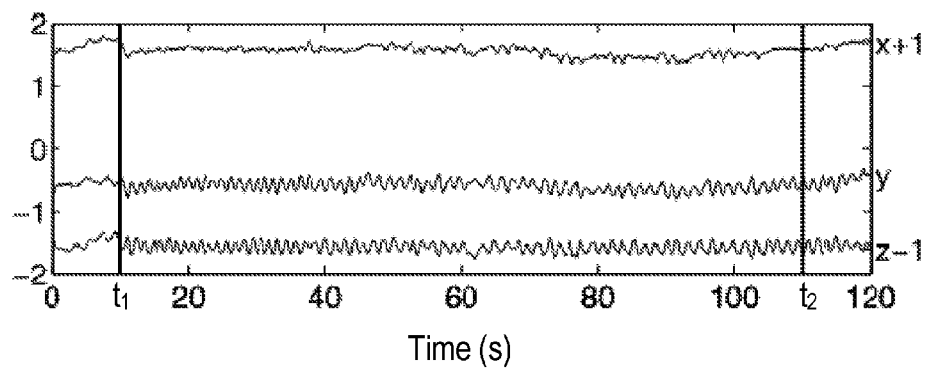
FIG. 4 shows an example set of unit magnetic vector from a magnetometer attached to the board of the surfer while the surfer is paddling.
Figure 7:
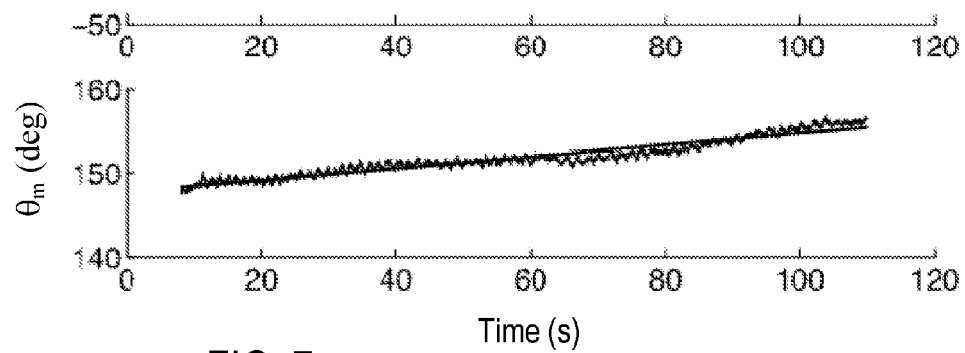
Figure 16:
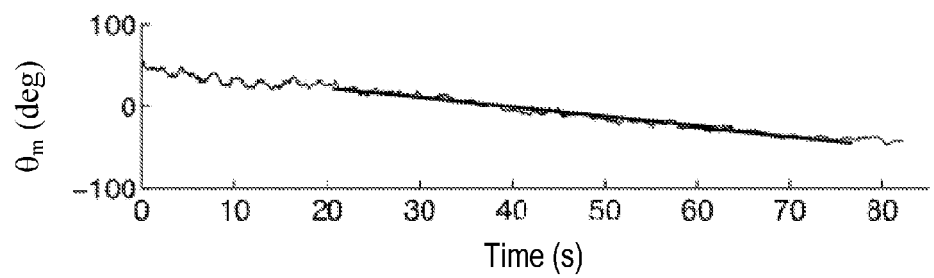

For example, FIG. 4 shows a set of unit magnetic vector (x+1, y, z−1) from a magnetometer attached to the board of the surfer while the surfer is paddling during the time period from $t_1$ to $t_2$. The unit magnetic vector is combined with the orientation data to generate the current magnetic declination $\theta_m$ illustrated in FIG. 7 to substitute for the orientation angle $\psi$. The line in FIG. 7 represents the linear fit to the magnetic declination $\theta_m$. Similarly, FIG. 16 illustrates the linear fitting of magnetic declination $\theta_m$ in the time period $t_3$ to $t_4$ when the skier descends the slope.

After a component of bias is estimated, it is removed from the gyroscope data before the next component is calibrated. This generally improves the quality of calibration.

The total bias is found by adding the individual components of bias together in vector fashion. If operations of computing the orientation from preliminary calibrated/corrected gyro signals and the bias component from the linear fitting of the orientation angles are repeated, the bias components are accumulated over the repetitions.

Figure 8:
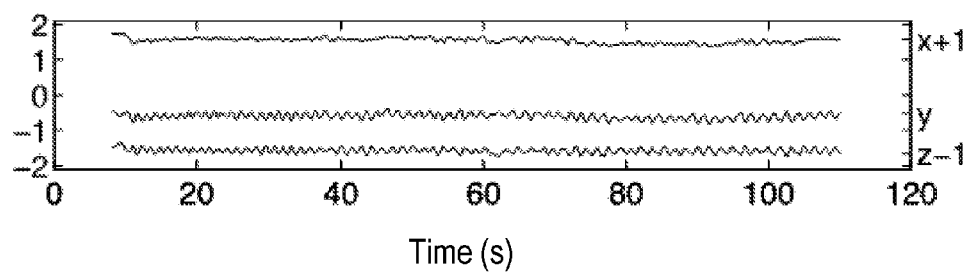
FIGS. 8-10 show magnetic data in global axes obtained from integrating gyroscope data, generated by the gyroscope attached to the board of the surfer while the surfer is paddling, before and after calibration in three iterations.
Figure 9:
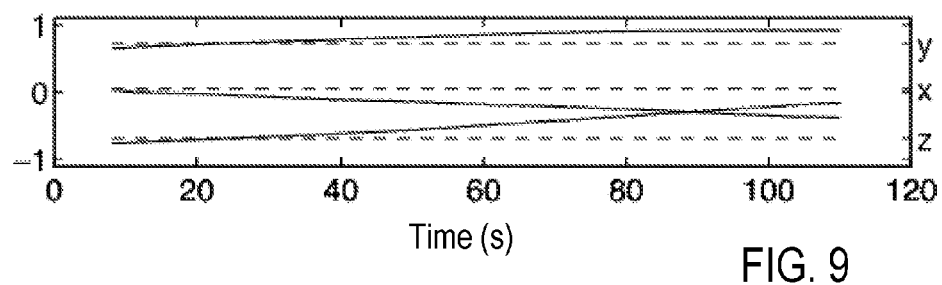
Figure 10:
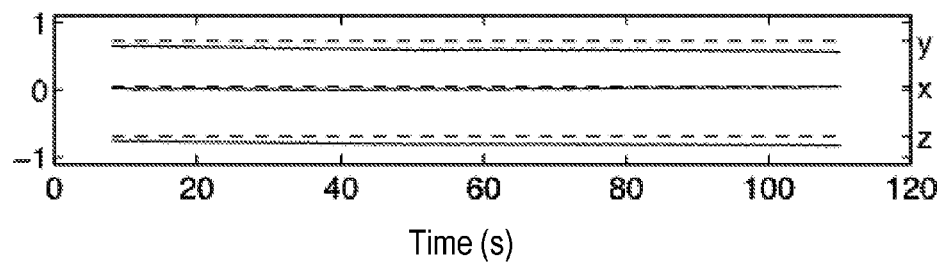
Figure 17:
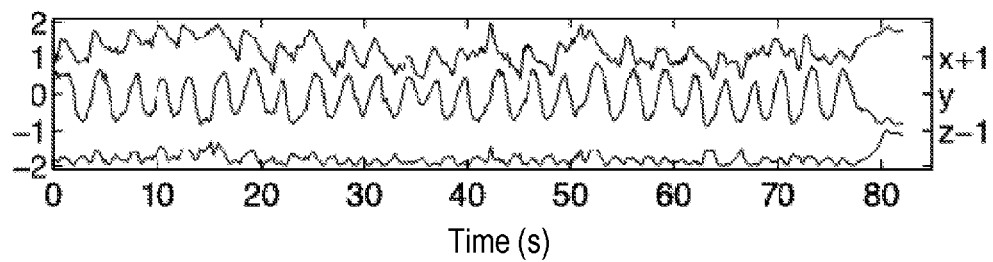
FIGS. 17-19 show magnetic data in global axes obtained from integrating gyroscope data, generated by the gyroscope attached to the ski of the skier while the skier descends the slope, before and after calibration in three iterations.
Figure 18:
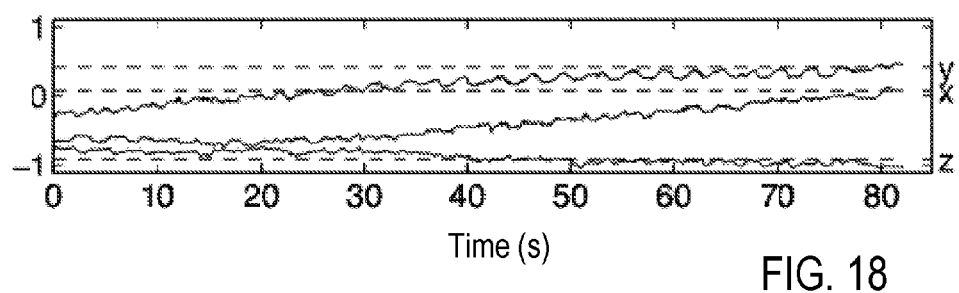

FIGS. 8-10 and 17-19 illustrate the improvements in gyroscope calibration over 3 iterations by looking at the magnetic data in global axes obtained from integrating gyroscope data before and after calibration in the surfing and skiing data examples. FIGS. 8 and 17 show the magnetic data on device axes (x+1, y, z−1). FIGS. 9 and 18 show the magnetic data on global axes before calibration, where the dashed lines represent the ideal magnetic vector. FIGS. 10 and 19 show the magnetic data on global axes after calibration, where the dashed lines represent the ideal magnetic vector.

In FIGS. 9-10 and 18-19, if gyro data is perfectly calibrated, the magnetic data expressed in global coordinates is expected to be constant, and matches the ideal magnetic vector constructed from the table look-up inclination and declination for the location. For both the surfing and skiing data examples, the improvement resulting from 3 iterations of calibration is significant.

Once the bias has been found, it can be removed from the gyroscope data over all time, or simply during the period of interest.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A system, comprising:
   a device comprising a gyroscope, the gyroscope configured to be subjected to motion of the device;
   a plurality of gyro sensors of the gyroscope, configured to measure the orientation of the gyroscope and generate corresponding signals to calibrate the gyroscope while it is in motion;
   at least one microprocessor; and
   memory coupled to the microprocessor and storing instructions that, when executed by the processor, cause the microprocessor to:
      store data representing the signals generated by the plurality of gyro sensors of the gyroscope during a period of time;
      identify a portion of the period of time, during which portion the gyroscope is subjected to the motion of the device;
      integrate, using the data, the signals with respect to time over the period of time to calculate orientation of the gyroscope as a function of time during the portion of the period of time;
      determine a deviation of a characteristic of the orientation of the gyroscope as the function of time during the portion of the period of time for the motion of the device, wherein the deviation is determined via:
         performing a linear fit of the orientation of the gyroscope as the function of time during the portion of the period of time; and
         determining a slope of the linear fit, wherein the deviation is based on the slope;
      identify, from the deviation, a component of bias in the signals generated by the plurality of gyro sensors;
      remove the component of bias from the data; and
      after removing the component of bias from the data, integrate, using the data having the component of bias being removed, the signals with respect to time over the period of time to recalculate the orientation of the gyroscope as a second function of time during the portion of the period of time.

2. The system of claim 1, wherein the instructions are further configured to instruct the microprocessor to:
   determine a second deviation of the characteristic of the orientation of the gyroscope as the second function of time during the portion of the period of time for the motion of the device comprising the gyroscope;
   identify, from the second deviation, a second component of bias in the signals generated by the plurality of gyro sensors; and
   remove the second component of bias from the data.

3. The system of claim 2, wherein the instructions are further configured to instruct the microprocessor to:
   repeatedly identify a new component of bias from a deviation of the characteristic of the orientation of the gyroscope using calibrated data for the signals and remove the new component of the bias from the calibrated data to update the calibrated data, until the new component is below a threshold.

4. The system of claim 1, wherein the orientation of the gyroscope is expressed in a form of roll, pitch, and yaw; and wherein each of roll, pitch and yaw of the orientation of the gyroscope is linear fitted with respect to time.

5. The system of claim 4, wherein the instructions are further configured to instruct the microprocessor to:
   determining an initial orientation of the gyroscope for the period of time based on a known orientation.

6. The system of claim 5, wherein yaw of the orientation of the gyroscope is substituted by a measurement of magnetic declination.

7. The system of claim 5, wherein the initial orientation is determined at a time instant when the gyroscope is in motion relative to earth.

8. A method to calibrate a gyroscope, the method comprising:
   subjecting the gyroscope to motion of a device comprising the gyroscope;
   measuring, by a plurality of gyro sensors of the gyroscope, orientation of the gyroscope during the motion of the device;
   generating, by the plurality of gyro sensors, signals corresponding to the measured orientation of the gyroscope during a period of time to calibrate the gyroscope while it is in motion;
   storing, in a computing device, data representing the generated signals generated by the plurality of gyro sensors of the gyroscope during the period of time;

identifying a portion of the period of time, during which portion the gyroscope is subjected to the motion of the device comprising the gyroscope;

integrating, by the computing device using the data, the signals with respect to time over the period of time to calculate orientation of the gyroscope as a function of time during the portion of the period of time;

determining, by the computing device, a deviation of a characteristic of the orientation of the gyroscope as the function of time during the portion of the period of time for the motion of the device comprising the gyroscope, wherein the deviation is determined via:

performing a linear fit of the orientation of the gyroscope as the function of time during the portion of the period of time; and determining a slope of the linear fit, wherein the deviation is based on the slope;

identifying, by the computing device from the deviation, a component of bias in the signals generated by the plurality of gyro sensors;

removing, by the computing device, the component of bias from the data; and after removing the component of bias from the data, integrating, by the computing device using the data having the component of bias being removed, the signals with respect to time over the period of time to recalculate the orientation of the gyroscope as a second function of time during the portion of the period of time.

9. The method of claim 8, further comprising, after removing the component of bias from the data:

determining, by the computing device, a second deviation of the characteristic of the orientation of the gyroscope as the second function of time during the portion of the period of time for the motion of the device comprising the gyroscope;

identifying, by the computing device from the second deviation, a second component of bias in the signals generated by the plurality of gyro sensors; and removing, by the computing device, the second component of bias from the data.

10. The method of claim 8, further comprising:

expressing the orientation of the gyroscope in a form of roll, pitch, and yaw;

wherein each of roll, pitch and yaw of the orientation of the gyroscope is linear fitted with respect to time.

11. The method of claim 10, further comprising:

determining an initial orientation of the gyroscope for the period of time while the gyroscope is in motion, based on a known orientation.

12. The method of claim 10, wherein yaw of the orientation of the gyroscope is substituted by a measurement of magnetic declination.

13. A non-transitory computer storage medium storing instructions configured to instruct a computing device to perform a method, the method comprising:

subjecting a gyroscope to motion of a device comprising the gyroscope;

measuring, by a plurality of gyro sensors of the gyroscope, orientation of the gyroscope during the motion of the device;

generating, by the plurality of gyro sensors, signals corresponding to the measured orientation of the gyroscope during a period of time to calibrate the gyroscope while it is in motion;

storing, in the computing device, data representing the generated signals generated by the plurality of gyro sensors of the gyroscope during the period of time;

identifying a portion of the period of time, during which portion the gyroscope is subjected to the motion of the device comprising the gyroscope;

integrating, by the computing device using the data, the signals with respect to time over the period of time to calculate orientation of the gyroscope as a function of time during the portion of the period of time;

determining, by the computing device, a deviation of a characteristic of the orientation of the gyroscope as the function of time during the portion of the period of time for the motion of the device comprising the gyroscope, wherein the deviation is determined via:

performing a linear fit of the orientation of the gyroscope as the function of time during the portion of the period of time; and determining a slope of the linear fit, wherein the deviation is based on the slope;

identifying, by the computing device from the deviation, a component of bias in the signals generated by the plurality of gyro sensors;

removing, by the computing device, the component of bias from the data; and after removing the component of bias from the data, integrating, using the data having the component of bias being removed, the signals with respect to time over the period of time to recalculate the orientation of the gyroscope as a second function of time during the portion of the period of time.

14. The non-transitory computer storage medium of claim 13, wherein the method further comprises:

after removing the component of bias from the data, determining a second deviation of the characteristic of the orientation of the gyroscope as the second function of time during the portion of the period of time for the motion of the device comprising the gyroscope;

identifying, from the second deviation, a second component of bias in the signals generated by the plurality of gyro sensors; and removing the second component of bias from the data.

15. The non-transitory computer storage medium of claim 14, wherein the method further comprises:

repeatedly identifying a new component of bias from a deviation of the characteristic of the orientation of the gyroscope using calibrated data for the signals and removing the new component of the bias from the calibrated data to update the calibrated data, until the new component is negligible.

* * * * *